No. 776,400. PATENTED NOV. 29, 1904.
W. T. JARBOE.
REIN SUPPORT.
APPLICATION FILED SEPT. 16, 1904.
NO MODEL.

Witnesses
F. A. Barron.
M. A. Schmidt

Wilson T. Jarboe, Inventor
by
Milo B. Stevens & Co. Attorneys.

No. 776,400. Patented November 29, 1904.

UNITED STATES PATENT OFFICE.

WILSON TURNER JARBOE, OF WINFIELD, MARYLAND.

REIN-SUPPORT.

SPECIFICATION forming part of Letters Patent No. 776,400, dated November 29, 1904.

Application filed September 16, 1904. Serial No. 224,725. (No model.)

*To all whom it may concern:*

Be it known that I, WILSON TURNER JARBOE, a citizen of the United States, residing at Winfield, in the county of Carroll and State of Maryland, have invented new and useful Improvements in Rein-Supports, of which the following is a specification.

My invention relates to rein-supports, and has for its object to provide a simple and efficient device of this kind which can be readily attached to a buggy or other vehicle and which will effectively prevent the reins from becoming tangled and will also support the same when not in use.

Improved details in the construction and arrangement of the various parts of the invention will be apparent from the detailed description hereinafter when read in connection with the appended claims, reference being had to the drawings hereto annexed, in which—

Figure 1:
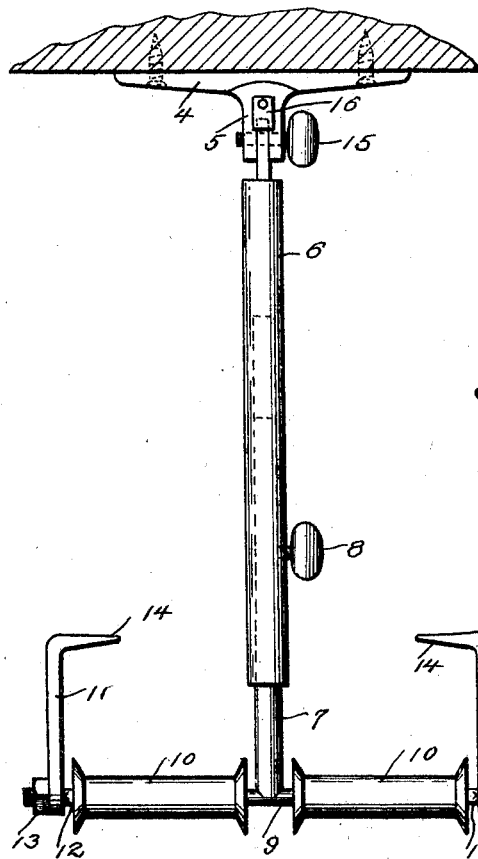
Figure 2:
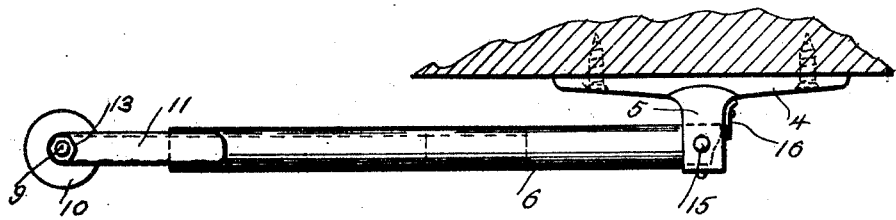

Figure 1 is a front elevation of the device. Fig. 2 is a side elevation thereof, showing its position when not in use.

Referring specifically to the drawings, 4 denotes an attaching-plate whereby the device is fastened to the buggy-top or other desired place, said plate being provided with screw or nail holes for this purpose.

At 5 is indicated a forked lug depending from the plate 4, to which lug the tubular stem 6 is hinged. A rod 7 fits in said stem, being vertically adjustable therein. A set-screw 8 or other suitable means are provided for holding the rod in adjusted position. The lower end of the rod has outwardly-extending horizontal branches 9, forming axles for the friction-rollers 10. At the outer ends of the axles are fastened guards for preventing the reins from slipping off the rollers when the device is in use. These guards comprise rods 11, which are slipped over squared portions 12 of the axles and secured by end nuts 13. The rods extend upwardly from the axles, and their upper ends are bent inwardly, as at 14, to extend above the rollers.

The stem 6 is hinged to the lug 5 by a set-screw 15, which when tightened binds the parts and holds the stem in adjusted position. When not in use, the device can be swung back close under the buggy-top, as shown in Fig. 2, so as to be out of the way. To assist in holding the stem, a flat spring 16 is provided, said spring being fastened to the lug and pressing on the stem.

In use the device will be swung downwardly, as shown in Fig. 1, and the reins placed over the rollers 10. The device is simple in construction and can therefore be cheaply made and sold. It can be readily attached to any vehicle and well serves the purpose for which it is intended.

Having thus described my invention, what is claimed as new, and desired to be secured by Letters Patent, is—

1. A rein-support comprising a tubular stem and means for attaching the same to a vehicle; a rod vertically adjustable in the stem, said rod having outwardly-extending branches; rollers mounted on said branches to receive the reins; and guards extending upwardly from the outer ends of the branches and above the rollers.

2. The combination with a vehicle-top, of a depending tubular stem hinged thereto and foldable against said top; a rod vertically adjustable in the stem, said rod having outwardly-extending branches; rollers mounted on said branches to receive the reins; and guards extending upwardly from the outer ends of the branches and above the rollers.

In testimony whereof I have signed my name to this specification in the presence of two subscribing witnesses.

WILSON TURNER JARBOE.

Witnesses:
ARTHUR M. ZILE,
HOWARD M. ZILE.